(12) United States Patent
Schroeder et al.

(10) Patent No.: US 6,481,761 B2
(45) Date of Patent: Nov. 19, 2002

(54) FRUSTO-CONICAL SEAL FITTING

(75) Inventors: Fred G. Schroeder, Grosse Ile, MI (US); Zhongping Zeng, Canton, MI (US)

(73) Assignee: Visteon Global Technologies, Inc., Dearborn, MI (US)

(*) Notice: Subject to any disclaimer, the term of this patent is extended or adjusted under 35 U.S.C. 154(b) by 0 days.

(21) Appl. No.: 09/790,397

(22) Filed: Feb. 21, 2001

(65) Prior Publication Data

US 2002/0113437 A1 Aug. 22, 2002

(51) Int. Cl.⁷ ................................................ F16L 19/00
(52) U.S. Cl. .................. 285/334.3; 285/328; 285/334.1
(58) Field of Search .......................... 285/332.2, 334.1, 285/324.3, 328, 259, 379

(56) References Cited

U.S. PATENT DOCUMENTS

| | | | | |
|---|---|---|---|---|
| 433,750 A | * | 8/1890 | Shields | 285/334.3 |
| 683,482 A | * | 10/1901 | Neumeyer | 285/254 |
| 1,136,226 A | * | 4/1915 | Glauber | 285/334.3 |
| 1,315,610 A | * | 9/1919 | Schulz | 285/334.3 |
| 2,357,669 A | * | 9/1944 | Lake | 285/334.3 |
| 2,362,686 A | * | 11/1944 | DeLano | 285/334.3 |
| 2,477,533 A | * | 7/1949 | Whting | 285/334.1 |
| 2,711,913 A | * | 6/1955 | Jungblut | 285/334.3 |
| 3,024,047 A | * | 3/1962 | Schmohl | 285/334.3 |
| 3,139,294 A | * | 6/1964 | Richards | 285/332.3 |
| 3,368,832 A | | 2/1968 | Rader | |
| 3,374,450 A | | 3/1968 | Stewart | |
| 5,082,243 A | | 1/1992 | Berglund et al. | |
| 5,364,135 A | * | 11/1994 | Anderson | 285/334.3 |
| 5,402,829 A | * | 4/1995 | Takikawa et al. | 285/334.3 |
| 5,503,438 A | * | 4/1996 | Swauger | 285/333.2 |
| 5,518,279 A | * | 5/1996 | Harle | 285/332.2 |

FOREIGN PATENT DOCUMENTS

| | | |
|---|---|---|
| FR | 889819 | 1/1943 |
| FR | 1463952 | 11/1966 |
| IT | 571178 | 12/1957 |
| RU | 974016 | 11/1982 |

\* cited by examiner

*Primary Examiner*—Eric K. Nicholson
(74) *Attorney, Agent, or Firm*—Brinks Hofer Gilson & Lione

(57) ABSTRACT

A seal fitting including a generally frusto-conical male component with a plurality of annularly stepped portions on its exterior surface and an annularly extending groove defined on one end. A frusto-conical elastomeric seal is also provided in contact with the stepped portions on the male component and a female component is provided that has a frusto-conical opening adapted to receive the male component and compress the frusto-conical seal between the male and female components.

35 Claims, 4 Drawing Sheets

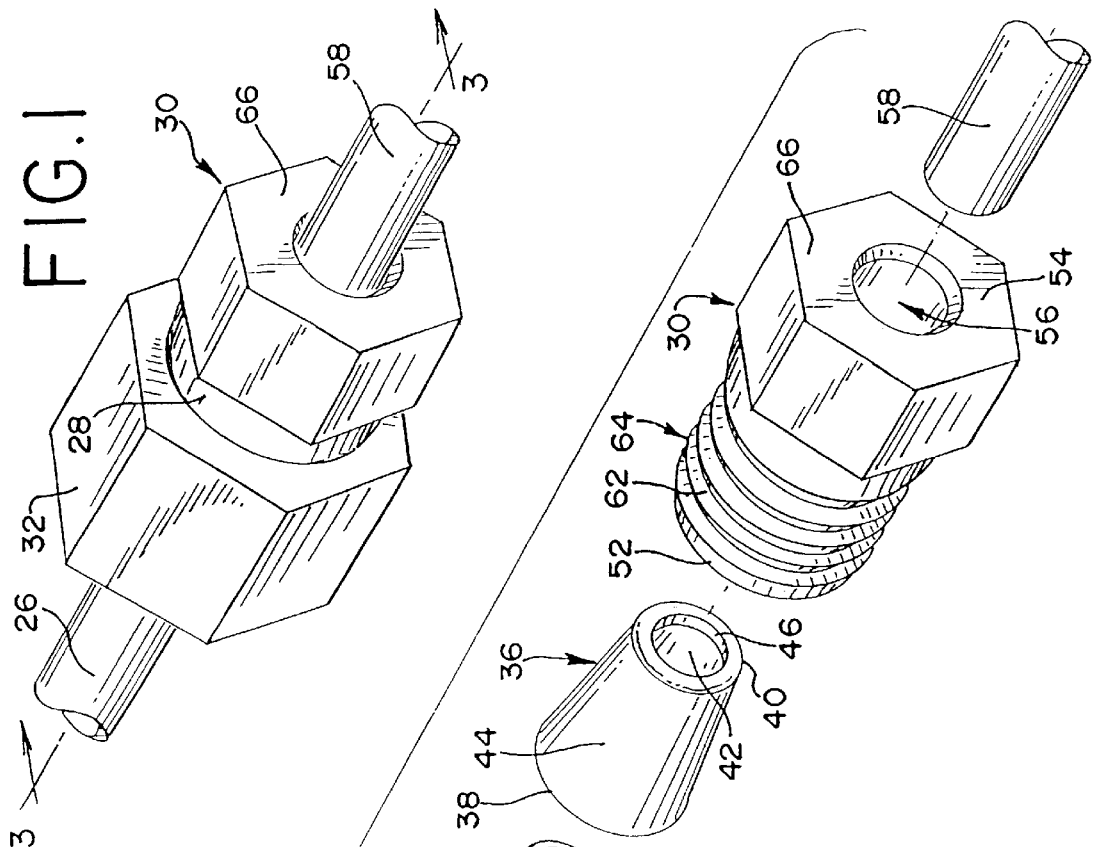
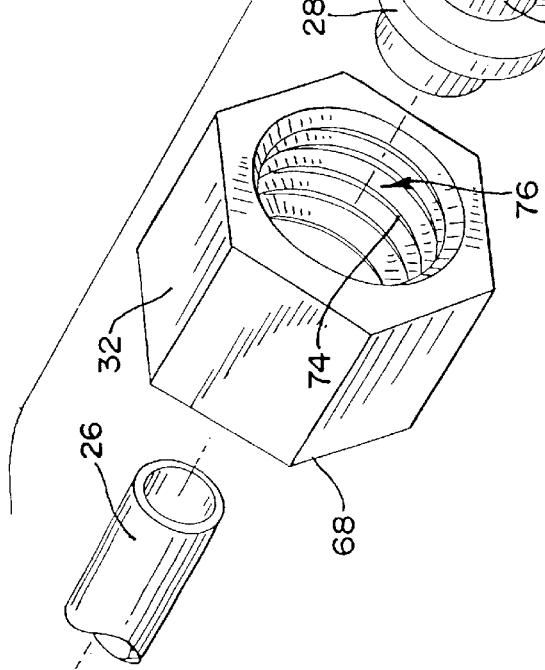

FRUSTO-CONICAL SEAL FITTING

FIELD OF THE INVENTION

This invention relates generally to the field of seal fittings. In particular, this invention relates to a frusto-conical seal fitting designed for low permeation of pressurized fluids such as refrigerants.

DESCRIPTION OF THE RELATED ART

In certain systems such as air conditioning systems in automobiles, it is necessary to provide a pathway for pressurized fluid such as Freon or other refrigerants. These pathways are commonly constructed of metal tubing and include numerous fittings as a way of linking sections of tubing together, linking componentry and simplifying construction of the pathways. The sizes and shapes of these parts may be adjusted as required.

However, the fittings may become vulnerable to leaks and other structural weaknesses in the pathway. This can result in a loss of some pressurization, or "permeation," and reduces the amount of fluid in the system. The loss of pressurization reduces the efficiency of the system and can lead to further damage to the system.

Many different techniques have been utilized to reduce the permeation of gas or fluid out of a closed system utilizing fittings. These techniques reduce permeation in a limited fashion, but it is desirable to reduce permeation even further. U.S. Pat. No. 3,368,832, for example, discloses a conduit and tube coupling for use in a system containing pressurized fluid or gas. The conduit and tube coupling consists of three separate components and an o-ring to complete the seal. An area is provided within the interior of the outer piece such that when the two inner pieces are secured together, one of the inner pieces expands outwardly into the open area of the outer piece. The o-ring seals the space between one inner piece and the outer piece. The expansion of the inner piece and the o-ring act to create a seal in the coupling and to prevent pressurized gas or fluid from escaping. However, the o-ring used in this invention is relatively thin. The thin material can allow some pressurized gas or fluid to permeate slowly from the system over time.

As another example of the prior art, U.S. Pat. No. 5,082,243 discloses a coupling for a gas container utilizing a metallic washer and a sloped surface. The washer contacts the sloped surface and provides a seal for a fitting in a system containing pressurized gas. The fitting consists of three components: a male component, a female component and a washer having a conical shape. A nut is positioned over the outside of the female component to hold the components together. The washer is positioned between a sloped surface of the female component and a sloped surface of the male component. The metal washer does not allow gas or fluid permeation over the life of the system. However, metal washers necessitate a near perfect fit, and are not forgiving to imperfections in the surfaces of the components. This creates an extra expense due to the complexity of the manufacturing process.

Other patents have also addressed the permeation problem in this type of system. For example, Italian Pat. No. 571178 illustrates a conical seal similar to the '243 patent. A thick conical seal is shown between two smooth sloped mating surfaces, once again increasing the path necessary for permeation. French Pat. No. 889.819 also illustrates a similar concept, except that the conical seal is even longer, increasing the permeation path to a greater extent.

French Pat. No. 1.463.952 illustrates a fitting similar to the '832 patent. An area of one component of the fitting is expanded into an open area in another component to complete the seal. Steps are defined in the open areas of the female component that create a tighter seal once the interior component is expanded. A separate sealing piece is not used in this design.

Russian Pat. No. 974,016 illustrates the use of a component with steps on its exterior surface. The component is mated with a union nipple having annular inclined elements in the shape of a comb and corresponding to the steps in the piece. The annular elements contact the steps and provide a metal-to-metal seal. Again, the metal-to-metal seal necessitates extremely precise manufacturing.

All of these inventions improve the efficiency of a system containing pressurized gas or fluid. However, it is still desirable to improve the efficiency of this type of fitting.

BRIEF SUMMARY OF THE INVENTION

In one embodiment of the present invention, a seal fitting includes a generally frusto-conical male component with a plurality of annularly stepped portions on its exterior surface and an annularly extending groove defined on one end. A frusto-conical elastomeric seal is also provided in contact with the stepped portions on the male component and a female component is provided that has a frusto-conical opening adapted to receive the male component and compress the frusto-conical seal between the male and female components.

In another embodiment of the present invention, a seal fitting includes a generally frusto-conical male component with a plurality of annularly stepped portions on its exterior surface and an axially extending passage defined within the male component. A frusto-conical seal is provided to substantially cover the exterior surface and the stepped portions on the male component. A female component is provided with a frusto-conical opening defined in its interior to receive the male component. The female component also has an axial passage defined within its interior.

In yet another embodiment of the present invention, a seal fitting includes a generally frusto-conical male component having a first end, a second end and an exterior surface. A frusto-conical seal adapted to cover at least a portion of the male component is provided along with a female component having a first and a second end. A frusto-conical opening is defined in axially within the female component and a plurality of stepped portions extend from at least one of the male and female components.

The invention may also be embodied in a method for preventing the permeation of pressurized fluid from a fitting. The method includes the steps of providing a male component having a generally frusto-conical exterior surface with a plurality of annularly extending steps on its exterior surface and an axially extending passage defined therein and a female component with a frusto-conical opening on one end and a passage extending axially therein. The method also includes the step of placing a seal adapted to conform to the exterior surface of the male component over the male component and inserting the male component into the frusto-conical opening of the female component so that the seal is compressed between the components.

BRIEF DESCRIPTION OF SEVERAL VIEWS OF THE DRAWINGS

FIG. 1 is a perspective view of an embodiment of the invention;

FIG. 2 is an exploded view of the embodiment shown in FIG. 1;

DETAILED DESCRIPTION OF THE PREFERRED EMBODIMENTS OF THE INVENTION

Figure 3:
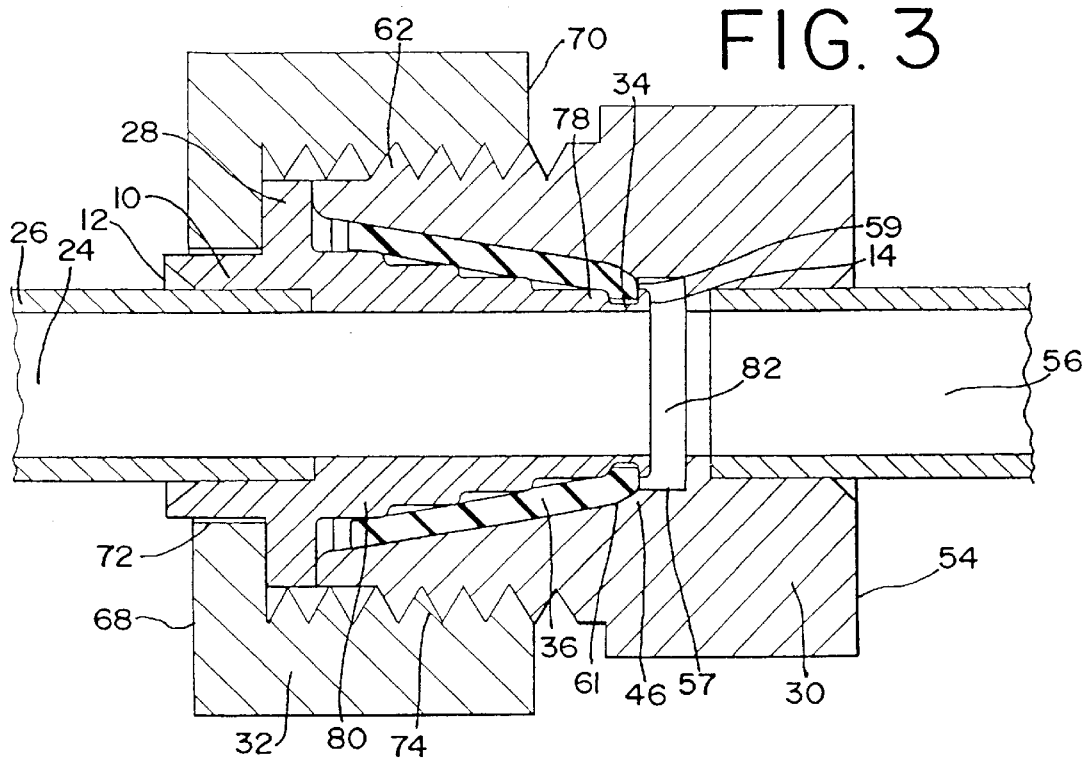
FIG. 3 is a cross-sectional view of the embodiment shown in FIG. 1 viewed along the line 3—3.
Figure 4:
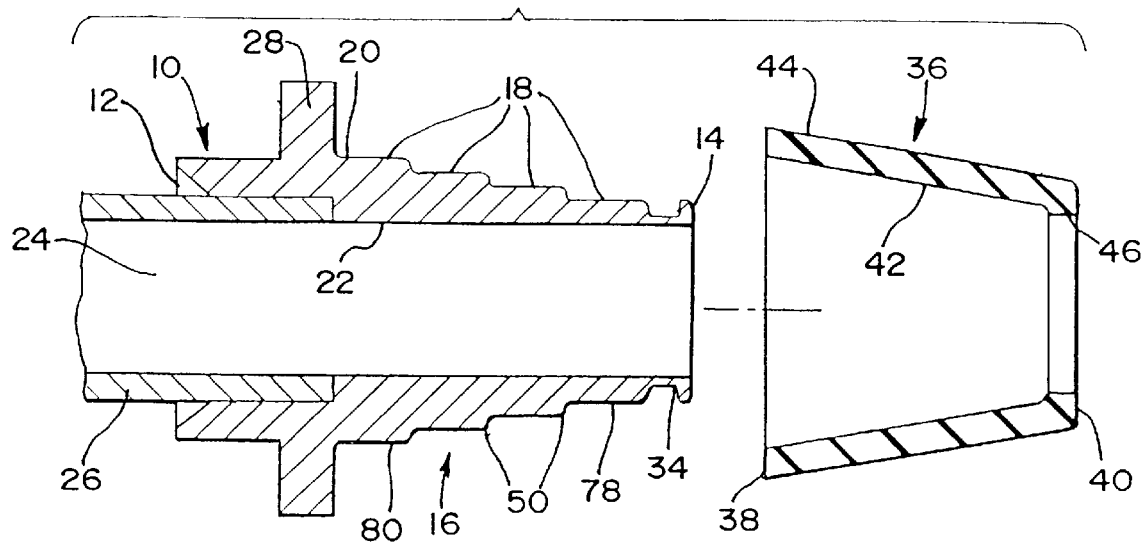
FIG. 4 is a cross-sectional view of the male piece and the conical seal of the embodiment shown in FIG. 1.
Figure 5:
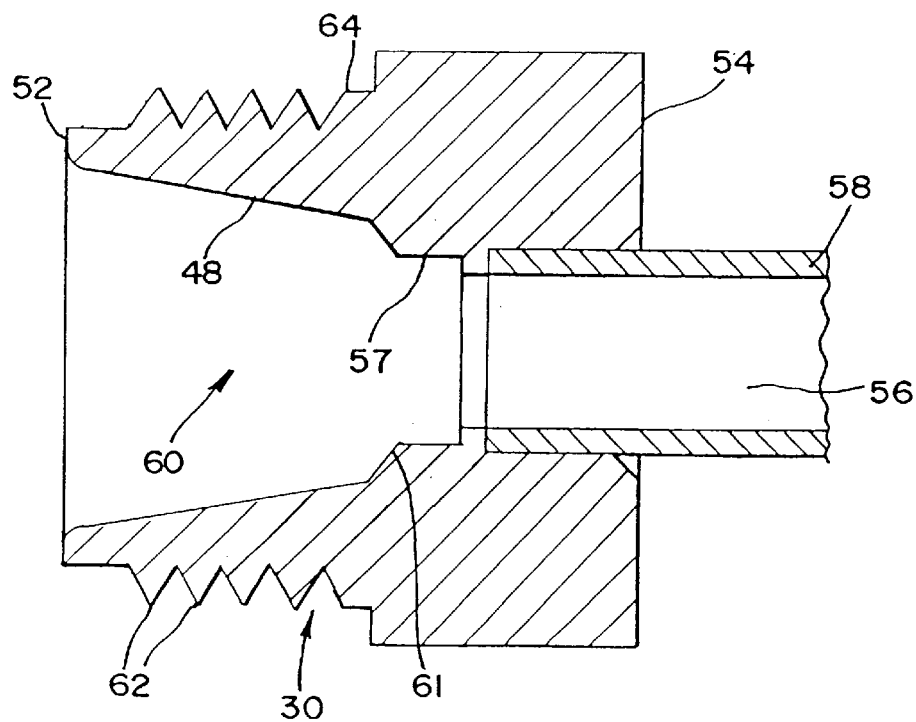
FIG. 5 is a cross-sectional view of the female piece of the embodiment shown in FIG. 1.

A preferred embodiment of the present invention is shown in FIGS. 1–5. FIGS. 1 and 3 show a preferred embodiment of the invention in its fully assembled state while FIG. 2 shows a preferred embodiment of the invention in an exploded, unassembled state. FIGS. 4 and 5 show a preferred embodiment of the male 10 and female 30 components. The male component 10 has a first end 12 and a second end 14 and a generally frusto-conical shaped section 16 preferably having a plurality of axially extending annular steps 18 on the exterior surface 20. The interior surface 22 is substantially smooth and an axially extending passage 24 is defined therein. The axially extending passage 24 defined in the male component 10 is preferably of a uniform interior diameter, and extends through the entire male component 10. Preferably, a similarly dimensioned tubular extension 26 is welded to the first end 12 of the male component 10. The extension 26 is preferably a metal cylinder.

The male component 10 preferably has a radially extending annular flange 28 near the first end 12 that acts as a stop when the male component 10 is joined with the female component 30. The flange 28 contacts the hexagonal nut 32 used to hold the male 10 and female 30 components together. The overall slope of the male component 10 is preferably about 10 degrees relative to the center axis, but can vary according to design requirements. The male component 10 also preferably defines an annular groove 34 on its exterior surface 20 adjacent the second end 14. This groove 34 functions as a locking channel for the frusto-conical seal 36.

In a preferred embodiment of the invention, a frusto-conical shaped seal 36 with a first end 38 and a second end 40 is provided to reduce the permeation of gas or fluid from the fitting. The frusto-conical seal 36 includes frusto-conical inner 42 and outer 44 smooth surfaces that preferably are defined to match the measurements of the slope of the male component 10. The frusto-conical seal 36 is preferably formed from rubber, plastic or a similar flexible or elastomeric material. In the present embodiment, the material preferably consists of fluorocarbon rubber having an average wall thickness of 1.2 mm. The material also preferably has a measured durometer of 85 Shore A, although other dimensions and qualities will be satisfactory for the present invention. Preferably, the interior surface 42 of the second end 40 of the frusto-conical seal 36 defines an inwardly projecting annular lip 46. In the present embodiment, this internally projecting annular lip 46 preferably extends radially 0.50 mm inward from the interior surface 42 of the frusto-conical seal 36. The groove 34 on the male component 10 preferably has a depth and width corresponding to the size of the annular lip 46 of the frusto-conical seal 36. This lip 46 acts to hold the frusto-conical seal 36 in place by locking into the groove 34 on the second end 14 of the exterior surface 20 of the male component 10, and assists in forming a better seal between components 10, 30 when they are joined together.

FIG. 3 is a cross-sectional view showing the frusto-conical seal 36 in place on the male component 10 and FIG. 4 shows a cross-sectional view of the male component 10 and the frusto-conical seal 36 unassembled. In this embodiment, the frusto-conical seal 36 covers the exterior surface 20 of the male component 10 and the steps 18 defined thereon. The steps 18 defined on the exterior surface 20 of the male component 10 provide high sealing pressure against the frusto-conical seal 36. This additional pressure provides a tighter seal for the fitting and results in less gas or fluid permeation out of the fitting. When the frusto-conical seal 36 is compressed after assembly, the flexible material of the frusto-conical seal 36 is squeezed by the interior frusto-conical surface 48 of the female component 30 such that the rounded corners 50 of the steps 18 on the exterior surface 20 of the male component 10 are pushed into the frusto-conical seal 36. An improved seal having multiple increased-force pressure points between the male component 10 and the seal 36 via the edges of the steps 18 is thus created.

As shown in the FIGS. 1–3, 5 and 7, a female component 30 is also provided in a preferred embodiment of the invention. The female component 30 has a first end 52 and a second end 54. The female component 30 preferably has an axially extending passage 56 defined therein beginning at the second end 54. A similarly dimensioned tubular extension 58 may be welded to the second end 54 of the female component 30. In the preferred embodiment, the axially extending passage 56 in the female component 30 has a diameter such that the second end 14 of the male component 10 does not touch the interior wall 57 of the axial passage 56 in the female component 30 when the male 10 and female 30 components are assembled. A small space 59 should remain between the second end 14 of the male component 10 and the interior wall 57 of the axial passage 56 in the female component 30. Partially through the female component 30, towards the first end 52, the axially extending passage 56 expands to form a frusto-conical space 60 having preferably the same slope as the frusto-conical seal 36 on the male component 10. The axial passage 56 begins with a slope preferably greater than the 10-degree slope of the frusto-conical seal 36. This sloped section 61 begins at the point where the annular groove 34 of the male component 10 nearest the second end 14 of the male component 10. The sloped section 61 prevents the elastomeric material of the frusto-conical seal 36 from decompressing into the void 82 between the male 10 and female 30 components when the pressure of the system changes, preventing damage to the frusto-conical seal 36.

The remainder of the frusto-conical space 60 is formed such that the frusto-conical seal 36 fits tightly against the interior surface 48 of the female component 30. This frusto-conical space 60 continues to the first end 52 of the female component 30 and provides an opening into which the male component 10 with the frusto-conical seal 36 covering the exterior surface 20 can preferably be inserted. The frusto-conical space 60 preferably has relatively smooth interior walls 48.

Preferably, the female component 30 defines a plurality of annular threads 62 on its exterior surface 64. In the embodiments shown in the Figures, the threads 62 of the female component 30 are near the first side 52 of the female component 30. The exterior of the female component 30 nearest the second end 54 is shown as a hexagonal shape 66 that can be utilized to assist in tightening or adjusting the fitting. However, the exterior surface 64 of the female component 30 near the second end 54 may be any shape.

Preferably a hexagonal nut 32 with a first end 68 and a second end 70 is provided as a compression fitting to clamp the male component 10 and the female component 30 together. Preferably, the hexagonal nut 32 defines an open interior and a larger opening in the second end 70 than in the first end 68. The opening on the first end 68 is preferably of a diameter that, when the hexagonal nut 32 is in place, allows the tubular extension 26 extending from the first end 12 of the male component 10 to pass through the opening in the first end 68 of the hexagonal nut 32. The diameter should allow the nut 32 to easily slide into place over the tubular extension 26 yet not be so large as to provide a large space between the tubular extension 26 and the interior surface 72 of the opening in the first end 68 of the nut 32. As shown in FIGS. 2 and 3, the hexagonal nut 32 preferably defines annularly extending threads 74 on the interior surface 76 beginning at the opening at the second end 70 of the nut 32 and continuing towards the first end 68 of the nut 32. These threads 74 match the threads 62 on the exterior surface 64 of the female component 30. The opening in the second end 70 of the nut 32 should be of a diameter such that the threads 74 of the nut 32 and the threads 62 of the female component 30 can intermesh.

Figure 6:
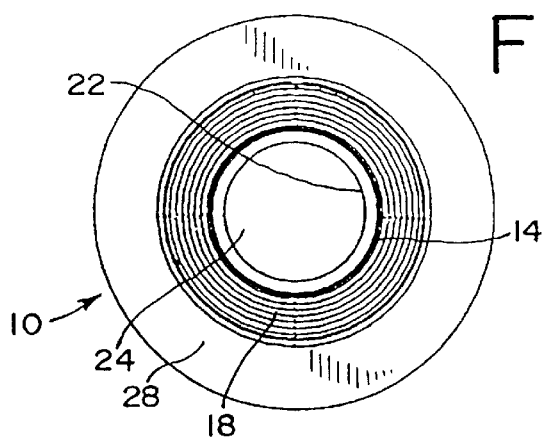
FIG. 6 is a side view of an embodiment of the male piece of the embodiment shown in FIG. 1.

FIG. 6 shows the male component 10 viewed from the second end 14 and looking through the axially extending passage 24. In this embodiment, the passage 24 has a diameter of 6.0 mm. The annular steps 18 are shown in this view and the diameter of each step 18 preferably increases slightly from the second end 14 of the male component 10 towards the first end 12. The step having the smallest annular diameter, step 78, is located nearest the second side 14 of the male component 10. The annular flange 28 preferably has a diameter substantially greater than the annular diameter of the step having the largest annular diameter, step 80. In the embodiment shown in FIGS. 1–7, there are four steps 18. Their respective diameters are 8.0 mm, 9.05 mm, 10.09 mm and 11.13 mm. Each step preferably has a length of 3.0 mm and preferably extends 0.50–0.525 mm radially further than the step adjacent to it. The annular flange 28 has a diameter of 17.0 mm. Of course, other dimensions than those specified may be utilized without departing from the present invention.

Figure 7:
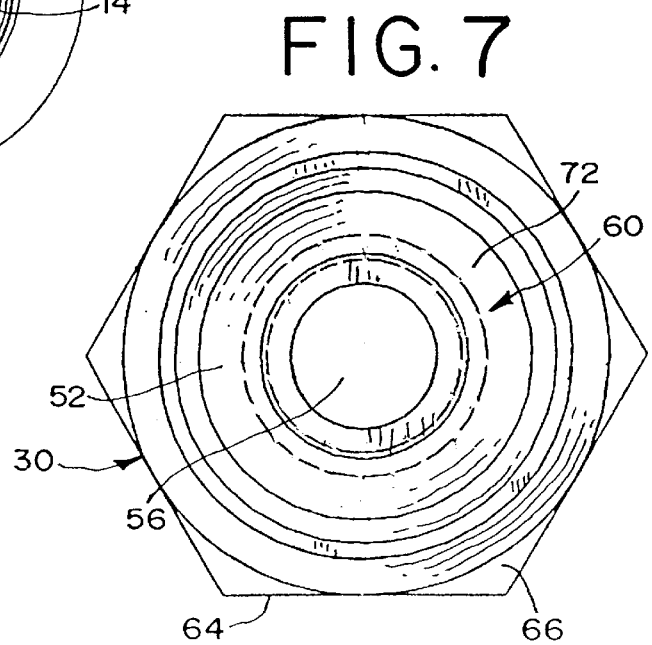
FIG. 7 is a side view of an embodiment of the female piece of the embodiment shown in FIG. 1.

FIG. 7 shows the female component 30 viewed through the frusto-conical space 60 from the first end 52. The threads 62 extending from the exterior surface 64 of the female component 30 are shown as well as the hexagonal shape 66 of the exterior surface 64. The axially extending passage 56 is also shown here and has a diameter of 6.0 mm in this embodiment.

Referring in conjunction to FIGS. 3, 4 and 5, cross-sections of a preferred embodiment of the invention are shown. FIG. 3 shows a preferred embodiment of the invention in its fully assembled state, while FIGS. 4 and 5 show the components 10, 30, 36 unassembled. The frusto-conical seal 36 is placed in contact with the groove 34 and the steps 18 on the exterior surface of the male component 10. The second end 14 of the male component 10 is inserted into the frusto-conical space 60 at the first end 52 of the female component 30 such that the frusto-conical seal 36 is in contact with the interior surface 48 of the frusto-conical space 60 in the female component 30. The second end 14 of the male component 10 is not in contact with the interior wall 57 of the axial passage 56 of the female component 30 and a space 59 remains between the components 10, 30. The axially extending passages 24, 56 are substantially aligned and a void 82 remains between the second end 14 of the male component 10 and the axially extending passage if 56 of the female component 30. The hexagonal nut 32 is positioned such that its threads 74 are intermeshed with the threads 62 on the female component 30. The opening in the first end 68 of the hexagonal nut 32 surrounds the tubular extension 26 extending from the first end 12 of the male component 10 but does not come in contact with it.

Figure 8:
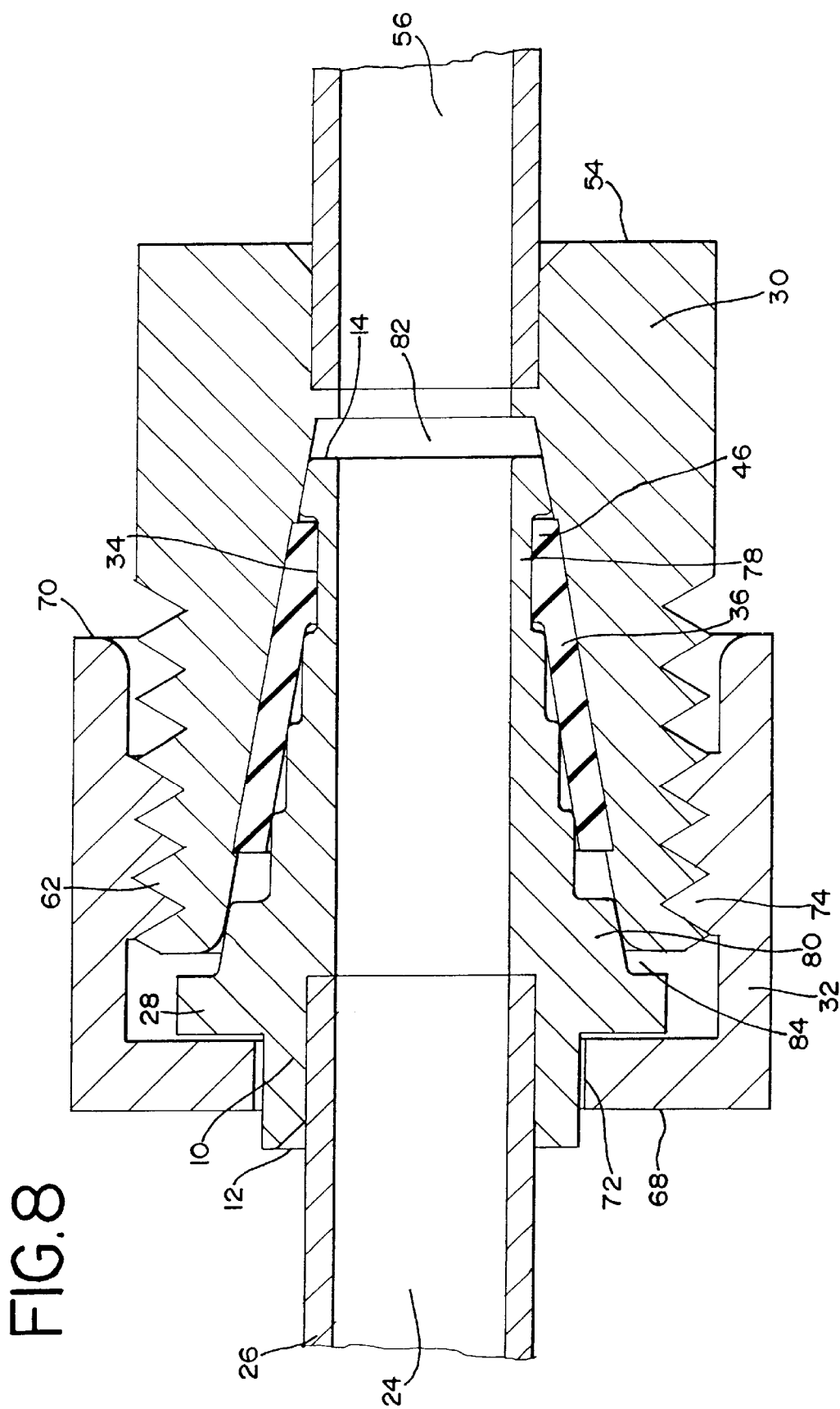
FIG. 8 is a cross-sectional view of an alternative embodiment of the invention.

The preferred sloped exterior surface 20 of the male component 10 and the corresponding slope of the frusto-conical space 60 in the female component 30 provide for simplified assembly and disassembly of the male 10 and female components 30. The frusto-conical seal 36 snaps into the groove 34 on the male component 10 for shipping and handling prior to assembly, and once assembled, the groove 34 and the corresponding annular projection 46 of the frusto-conical seal 36 hold the frusto-conical seal 36 tightly in place and form additional contact surfaces between the frusto-conical seal 36 and the componentry to provide further barriers against permeation. Once assembled, the length of the frusto-conical seal 36 creates a longer permeation pathway than has been produced in the prior art. The design of the steps 18 on the male component 10 and their interaction with the frusto-conical seal 36 also provides a more secure and effective seal than the prior art. It is important to note that the steps 18 may have other configurations that provide multiple sealing points of contact between the male component 10 and the frusto-conical seal 36. For example, the steps 18 may be defined on the interior surface of the female component 30. Furthermore, instead of steps 18 as shown, upstanding threads, similar to those defined on a bolt projection, may be defined on the male component 10 or the female component 30. Upstanding annular ribs or other projecting structures may also be defined on the male 10 and/or female 30 component surfaces In an alternative embodiment of the present invention shown in FIG. 8, the space 59 between the male 10 and female 30 components is completely eliminated, resulting in metal-to-metal contact and a seal better adapted to higher pressure systems. In this embodiment, the second end 14 of the male component 10 preferably is expanded radially outwardly and the outer surface is sloped to match the slope of the frusto-conical space 60 defined in the female component 30. The differently sloped section 61 of the female component 30 is eliminated. The second end 14 of the male component 10 contacts the interior wall 57 of the female component 30. The largest step 80 on the male component 10 is expanded and similarly sloped to match the shape of the frusto-conical space 60 in the female component 30. To ensure metal-to-metal contact between the largest step 80 of the male component 10 and the female component 30 as well as between the second end 14 of the male component 10 and the female component 30, a gap 84 is defined between the annular flange 28 on the male component 10 and the largest step 80 on the male component 10. The frusto-conical seal 36 preferably does not contact the largest step 80 on the male component 10.

It should be noted that there could be a wide range of changes made to the present invention without departing from its scope. Different materials could be used to produce the frusto-conical seal 36 and the male 10 and female 30 parts, as well as the hexagonal nut 32. The shape of the nut 32 could be adjusted, or the components 10, 30 could be secured together by an adhesive or another securing method. It should also be noted that the exemplary slope of the male component 10 and corresponding frusto-conical opening 60 in the female component 30 as well as the slope of the differently-sloped section 61 are meant to be examples and could be adjusted to any slope measurements, and variations between the general slopes of the male component 10, the female component 30 and the opening 60 may be utilized to change the fit of the components 10, 30. Thus, it is intended that the foregoing detailed description be regarded as illustrative rather than limiting and that it be understood that it is the following claims, including all equivalents, which are intended to define the scope of the invention.

What is claimed is:

1. A seal fitting comprising:
    a generally frusto-conical male component having a central axis, a first end and a second end and an outer surface upon which is defined a plurality of annularly stepped portions each of said stepped portions having an axially extending portion extending generally parallel to the axis of said male component;
    an annularly extending groove defined on the exterior surface of an end of said male component;
    a frusto-conical elastomeric seal axially aligned with said male component and having a first end and a second end and being in contact with at least a plurality of said stepped portions of said male component; and
    a female component having a first end and a second end and having a frusto-conical opening defined therein, said opening aligned axially with said male component and adapted to receive said frusto-conical seal and to compress said seal therebetween.

2. The seal fitting of claim 1, wherein said frusto-conical seal has an internally projecting annular lip on said second end of said male component, said lip adapted to fit within said annularly extending groove on said male component.

3. The seal fitting of claim 2, wherein said frusto-conical seal is in contact at least a plurality of said annularly stepped portions on said external surface of said male component and said internally projecting annular lip of said frusto-conical seal is seated within said groove on said male component.

4. The seal fitting of claim 3, wherein said first end of said male component is inserted into said first end of said female component.

5. The seal fitting of claim 4, wherein said frusto-conical seal is made of an elastomer.

6. The seal fitting of claim 5, wherein said second end of said male component has a smaller outside diameter than said first end of said male component.

7. The seal fitting of claim 6, wherein said male and female components each have an axially extending passage defined therein.

8. The seal fitting of claim 7, wherein said second end of said male component is placed within said frusto-conical opening in said female component such that said frusto-conical seal on said male component is in contact with said frusto-conical opening defined in said female component and said axially extending passages of said male and said female components substantially align.

9. The seal fitting of claim 8, wherein said female component has a plurality of annularly extending threads defined on its outer surface.

10. The seal fitting of claim 9, wherein a nut with annularly extending threads defined on its internal surface is coupled with said threads on said female component.

11. The seal fitting of claim 10, wherein said nut has an axially extending opening defined therein.

12. A seal fitting comprising:
    a male component having a generally frusto-conical shape extending along an axis, said male component defining a plurality of annularly extending stepped portions on an exterior surface of said male component, each stepped portion extending axially generally parallel to the axis of said male component and an axially extending passage defined in the interior of said male component;
    a frusto-conical seal adapted to substantially cover said exterior surface and to substantially cover at least a plurality of said stepped portions on said male component; and
    a female component having a first end and a second end, a frusto-conical opening defined in its interior into which said male component is inserted, and an axial passage extending from said first end to said second end.

13. The seal fitting of claim 12, wherein said male component is placed within said frusto-conical opening defined in said female component such that said frusto-conical seal is in contact with an interior surface of said female component.

14. The seal fitting of claim 13, wherein said frusto-conical seal is compressed between said male component and said female component.

15. The seal fitting of claim 14, wherein said female component has a plurality of annular threads defined on its outer surface.

16. The seal fitting of claim 15, wherein a nut with a plurality of annular threads defined on its interior surface is placed such that said threads are coupled with said threads defined on said female component.

17. A seal fitting comprising:
    a generally frusto-conical male component having a central axis and having a first end, second end and an exterior surface;
    a frusto-conical elastomeric seal adapted to cover at least a portion of said male component;
    a female component having a central axis and having a first end and a second end and having a frusto-conical opening defined axially therein; and
    a plurality of stepped portions extending from at least one of said male and said female components, each stepped portion having an axially extending portion extending generally parallel to the axis of at least one of said male and said female components.

18. The seal fitting of claim 17, wherein said opening of said female component is adapted to receive said male component and to compress said elastomeric seal therebetween.

19. The seal fitting of claim 18, wherein said male component has an annularly extending groove defined on said exterior surface.

20. The seal fitting of claim 19, wherein said frusto-conical seal has an internally projecting annular lip that is adapted to fit into said annularly extending groove defined on said male component.

21. The seal fitting of claim 20, wherein said female component has a plurality of annularly extending threads defined on its outer surface.

22. The seal fitting of claim 21, wherein a nut with annularly extending threads defined on its internal surface is coupled with said threads on said female component.

23. A method for preventing the permeation of pressurized fluid from a fitting, said method comprising the steps of:
providing a male component having a central axis and a plurality of annularly extending steps defined on an exterior surface thereof, each step having an axially extending portion extending generally parallel to the axis of said male component, and an axially extending passage defined therein;
providing a female component with a first end and a second end, a frusto-conical opening defined in said first end and a passage extending axially from said first end to said second end of said female component;
placing a seal adapted to conform to said exterior surface of said male component over said male component; and
inserting said male component into said frusto-conical opening of said female component such that said frusto-conical seal contacts said female component and is compressed between said components.

24. The method of claim 23, further comprising the step of providing a plurality of annular threads defined upon the outside surface of said female component.

25. The method of claim 24, further comprising the step of providing a nut with a plurality of annular threads defined upon its internal surface and coupling said threads with said threads on said female component to hold said male and female components together.

26. A seal fitting comprising:
a generally frusto-conical male component having a first end and a second end and an outer surface upon which is defined a plurality of annularly stepped portions, said second end of said male component having a smaller outside diameter than said first end of said male component said male component having an axially extending passage defined therein, and an annularly extending groove defined on the exterior surface of an end of said male component;
a frusto-conical elastomeric seal in contact with at least a plurality of said stepped portions of said male component, said frusto-conical seal having an internally projecting annular lip on said second end of said frusto-conical seal, said lip adapted to fit within said groove on said male component, said frusto-conical seal positioned such that it is in contact with at least a plurality of said annularly stepped portions on said external surface of said male component and said internally projecting annular lip of said frusto-conical seal is seated within said groove on said male component;
a female component having a first end, a second end, an axially extending passage defined therein, and having a frusto-conical opening defined axially therein, said opening adapted to receive said male component and to compress said frusto-conical seal therebetween;
wherein said first end of said male component is inserted into said first end of said female component and said second end of said male component is placed within said frusto-conical opening in said female component such that said frusto-conical seal is in contact with said frusto-conical opening defined in said female component and said axially extending passages of said male and said female components substantially align with each other.

27. The seal fitting of claim 26, wherein a nut with annularly extending threads defined on its internal surface is coupled with said threads on said female component.

28. The seal fitting of claim 27, wherein said nut has an axially extending opening defined therein.

29. A seal fitting comprising:
a generally frusto-conical male component having a first end, second end, an exterior surface, and an annularly extending groove defined on said exterior surface;
a frusto-conical elastomeric seal adapted to cover at least a portion of said male component;
a female component having a first end and a second end and having a frusto-conical opening defined axially therein, said opening of said female component being adapted to receive said male component and to compress said elastomeric seal therebetween; and
a plurality of stepped portions extending from at least one of said male and said female components.

30. The seal fitting of claim 29, wherein said opening of said female component is adapted to receive said male component and to compress said elastomeric seal therebetween.

31. The seal fitting of claim 30 wherein said male component has an annularly extending groove defined on said exterior surface.

32. The seal fitting of claim 31, wherein said frusto-conical seal has an internally projecting annular lip that is adapted to fit into said annularly extending groove defined on said male component.

33. The seal fitting of claim 11, wherein said frusto-conical seal is removable from said male component.

34. The seal fitting of claim 16, wherein said frusto-conical seal is removable from said male component.

35. The seal fitting of claim 22, wherein said frusto-conical seal is removable from said male component.

* * * * *